(12) United States Patent
Doucet et al.

(10) Patent No.: US 11,314,332 B2
(45) Date of Patent: Apr. 26, 2022

(54) INFORMATION PROCESSING APPARATUS, INFORMATION PROCESSING METHOD, AND PROGRAM

(71) Applicant: SONY INTERACTIVE ENTERTAINMENT INC., Tokyo (JP)

(72) Inventors: Nicolas Doucet, Yokohama (JP); Masayuki Yamada, Kanagawa (JP); Hideyuki Uchida, Ibaraki (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 16/762,555

(22) PCT Filed: Nov. 19, 2018

(86) PCT No.: PCT/JP2018/042709
§ 371 (c)(1),
(2) Date: May 8, 2020

(87) PCT Pub. No.: WO2019/107207
PCT Pub. Date: Jun. 6, 2019

(65) Prior Publication Data
US 2020/0333883 A1 Oct. 22, 2020

(30) Foreign Application Priority Data
Nov. 30, 2017 (JP) .............................. JP2017-230781

(51) Int. Cl.
*G06F 3/01* (2006.01)
*G05G 5/03* (2008.04)

(52) U.S. Cl.
CPC ............... *G06F 3/016* (2013.01); *G05G 5/03* (2013.01); *G05G 2505/00* (2013.01)

(58) Field of Classification Search
CPC ....... G06F 3/016; G05G 5/03; G05G 2505/00
See application file for complete search history.

(56) References Cited

U.S. PATENT DOCUMENTS

| 6,184,868 | B1 * | 2/2001 | Shahoian | ................ | A63F 13/06 345/161 |
| 2015/0116205 | A1 * | 4/2015 | Westerman | ............. | G06F 3/044 345/156 |
| 2016/0349912 | A1 * | 12/2016 | Faubert | ................... | G06F 3/016 |

FOREIGN PATENT DOCUMENTS

| JP | 2000515285 A | 11/2000 |
| JP | 2010061667 A | 3/2010 |

(Continued)

OTHER PUBLICATIONS

International Search Report and Written Opinion dated Jan. 8, 2019, from International Patent Application No. PCT/JP2018/042709, 10 sheets.

(Continued)

*Primary Examiner* — Robert J Michaud
(74) *Attorney, Agent, or Firm* — Katten Muchin Rosenman LLP

(57) ABSTRACT

An information processing apparatus that is connected to a device having a button that can be pressed within a prescribed movement range, detecting the push-in position when the button is pressed, and being capable of presenting a resistance force against a pressing force of the button and that determines control information indicating the magnitude of the resistance force to be presented, which relates to the push-in position of the button on the basis of a determination standard that includes at least one of the number of pressing actions, past maximum push-in position, and duration of pressing operation of the button of the device.

9 Claims, 4 Drawing Sheets

(56) References Cited

FOREIGN PATENT DOCUMENTS

| JP | 2017-123039 A | 7/2017 | |
|---|---|---|---|
| JP | 2017-161972 A | 9/2017 | |
| WO | 9826342 A2 | 6/1998 | |
| WO | 2017/150128 A1 | 9/2017 | |
| WO | 2017/159032 A1 | 9/2017 | |
| WO | WO-2017159032 A1 * | 9/2017 | ............... G06F 3/01 |

OTHER PUBLICATIONS

International Preliminary Report on Patentability dated Jun. 11, 2020, from International Patent Application No. PCT/JP2018/042709, 16 sheets.

Decision to Grant a Patent dated Apr. 27, 2021, from Japanese Patent Application No. 2019-557160, 3 sheets.

* cited by examiner

F I G . 1
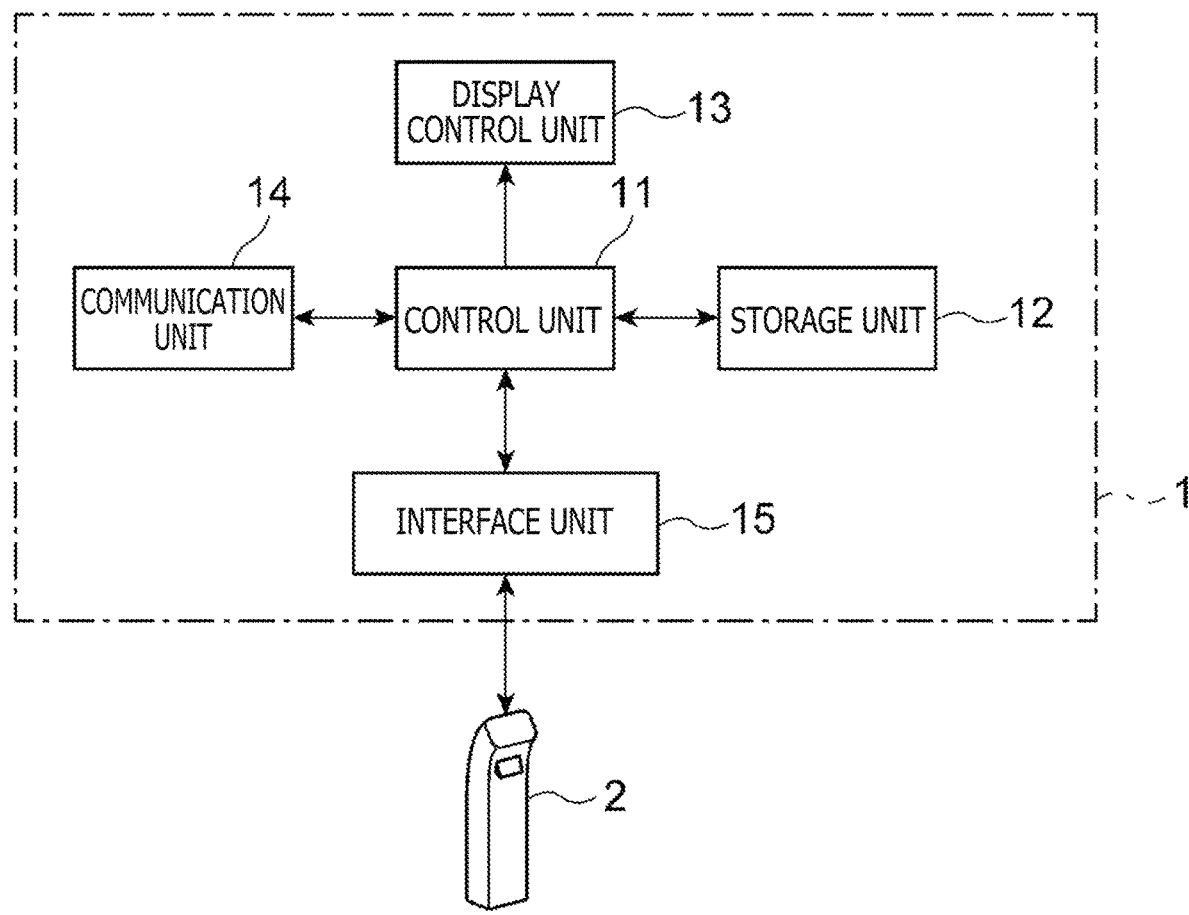

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

In recent years, a virtual reality technology for allowing operation of a virtual object in a virtual space by using a device such as a head-mounted display has become widespread. In such information processing of virtual reality, a user generally operates a virtual object by use of a general game controller or a controller device having a shape that can be held by a hand.

In such a controller device such as the conventional game controller, tactile feedback is provided to a user's operation by using a vibrator or the like. For example, when a user performs an operation of shooting a gun which is a virtual object in a virtual space, tactile feedback indicating that the shooting is being performed is provided by causing the vibrator to vibrate.

SUMMARY

Technical Problem

However, in the above-described conventional technology, tactile feedback to a user's operation is provided, but it has not been considered that the state of the target object changes as a result of the operation.

The present invention has been made in view of the above circumstances, and an object of the present invention is to provide an information processing apparatus, an information processing method, and a program capable of further improving the sense of reality of tactile feedback by relatively simple processing.

Solution to Problem

The present invention which solves the problem of the above conventional example relates to an information processing apparatus connected to a device which has a button that can be pressed in a predetermined movable range, which detects the push-in position when the button is pressed, and which can present a resistance force that repels the pressing force of the button, and the information processing apparatus includes determination means that determines control information indicating a magnitude of the resistance force to be presented, which is related to the push-in position of the button, on the basis of a determination criterion including at least one of the number of pressing actions, past maximum push-in position, and duration of the pressing operation of the button of the device, and includes means that outputs the determined control information to the device.

Advantageous Effect of Invention

According to the present invention, the sense of reality of tactile feedback can be further improved by relatively simple processing.

BRIEF DESCRIPTION OF DRAWINGS

FIG. 1 is a block diagram illustrating a configuration example of an information processing apparatus according to an embodiment of the present invention.

DESCRIPTION OF EMBODIMENT

Figure 2:
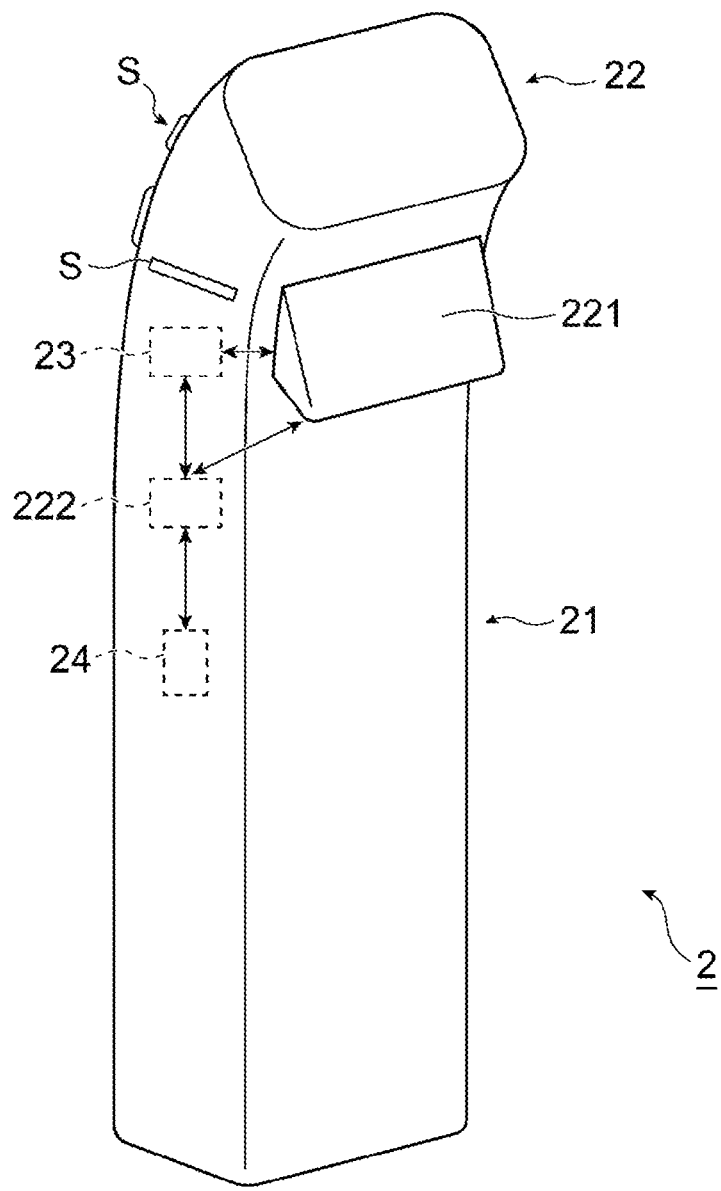
FIG. 2 is a schematic diagram illustrating an example of an operation device connected to the information processing apparatus according to the embodiment of the present invention.

An embodiment of the present invention will be described with reference to the drawings. An information processing apparatus 1 according to the embodiment of the present invention includes a control unit 11, a storage unit 12, a display control unit 13, a communication unit 14, and an interface unit 15, as illustrated in FIG. 1. In addition, an operation device 2 is connected to the information processing apparatus 1 via the interface unit 15.

Here, the control unit 11 is a program control device such as a CPU (Central Processing Unit), and operates in accordance with a program stored in the storage unit 12. In an example of the present embodiment, the control unit 11 determines the control information representing the magnitude of the resistance force against the button pressing, which is presented to the user, on the basis of a prescribed determination criterion relating to a button included in the operation device 2 to be described later.

Here, the determination criterion includes at least one of the number of past pressing actions, the past maximum push-in position, and the duration of the past pressing operation. The control unit 11 determines control information that indicates the magnitude of the resistance force against the pressing of the button, to be presented to the user in relation to the push-in position of the button of the operation device 2, on the basis of such a determination criterion. Then, the control unit 11 outputs the determined control information to the operation device 2. The detailed operation of the control unit 11 will be described later.

The storage unit 12 includes a memory device, a disk device, and the like, and holds a program executed by the control unit 11. This program may be one stored and provided in a non-transitory computer-readable storage medium such as a DVD-ROM (Digital Versatile Disc-Read Only Memory) and then stored in the storage unit 12, or one distributed via a network or the like to be stored in the storage unit 12. The storage unit 12 also operates as a work memory of the control unit 11.

The display control unit 13 is connected to a display of a television, a monitor, an HMD (head mounted display) or the like, and outputs information regarding images to be displayed on the display in accordance with an instruction input from the control unit 11. The communication unit 14 is a network interface or the like, and receives data via the network or sends data via the network in accordance with an instruction input from the control unit 11.

The interface unit 15 includes a wired or wireless interface such as a USB (Universal Serial Bus) interface or Bluetooth (registered trademark) and receives information input from the operation device 2 and related to the instruction operation and outputs the information to the control unit 11. Further, the interface unit 15 sends information such as control information input from the control unit 11 to the operation device 2.

As illustrated in FIG. 2, for example, the operation device 2 includes a cylindrical or polygonal grip portion 21 and an operational portion 22 continuously formed from the grip portion 21. Further, the operational portion 22 also includes a push button 221 arranged at a position where the button can be operated by the user's index finger when the user grips the operation device 2. The push button 221 can be pushed so that the position of an outer surface 221F (a surface exposed to the outside of the housing and touched by a user's finger) is locates in a predetermined movable range between a first position P1 where the outer surface protrudes outside from the housing of the operation device 2 and a second position P2 where the button has been pushed toward the housing, for example. Further, in the state of not being operated by the user, the push button 221 is in a state of being urged by an elastic body or the like so that its outer surface moves to the first position P1.

Further, the operational portion 22 includes a control unit 222 that outputs information representing the content of a user's operation of the operation device 2 to the information processing apparatus 1. The control unit 222 includes a program control device such as a microcomputer, and outputs information that indicates the operation content including information indicating the push-in amount of the push button 221 to the information processing apparatus 1, in the example of the present embodiment.

In an example of the present embodiment, the operation device 2 may include a tilt sensor (not illustrated), push switches (S in FIG. 2) and the like, and in this case, the control unit 222 outputs the information regarding the attitude of the operation device 2 (information regarding the tilt angle) detected by the tilt sensor and the information regarding the operation of the push switches to the information processing apparatus 1 with these pieces of information included in the information indicating the operation content.

Figure 3:
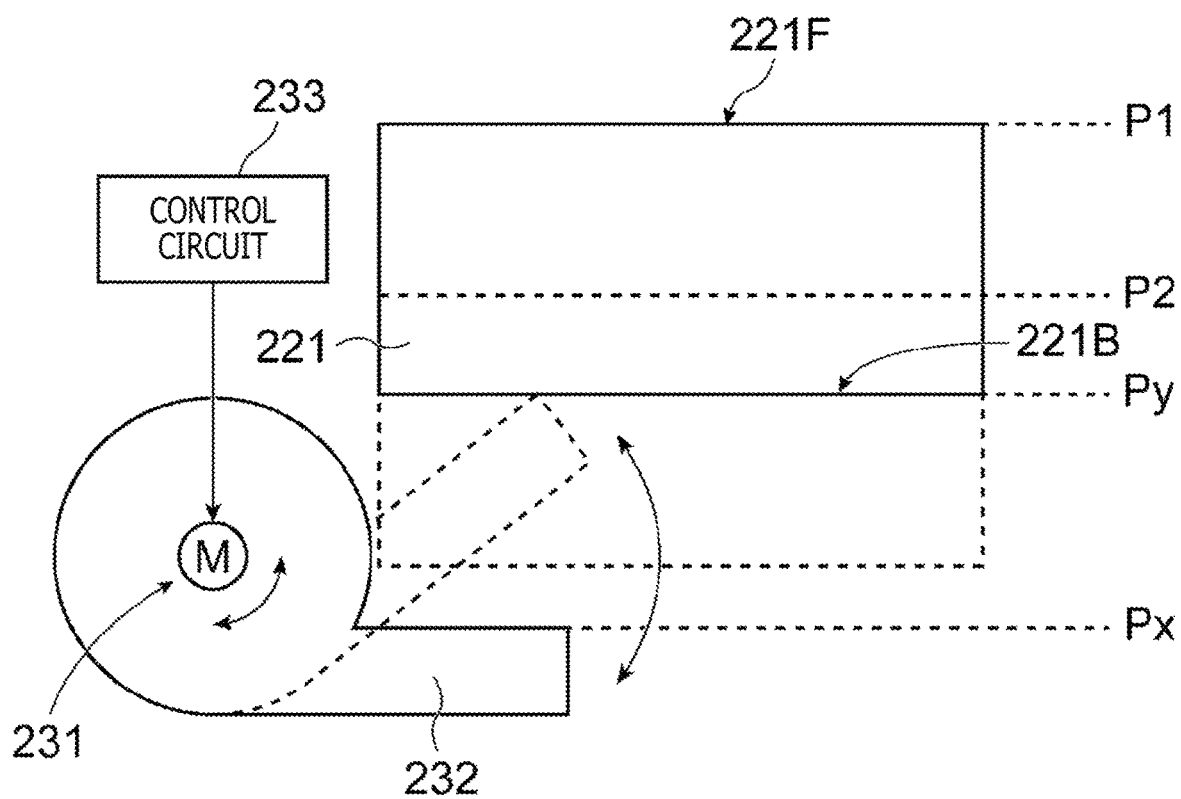
FIG. 3 is an explanatory diagram illustrating an example of a reaction force presenting unit of the operation device connected to the information processing apparatus according to the embodiment of the present invention.
Figure 4:
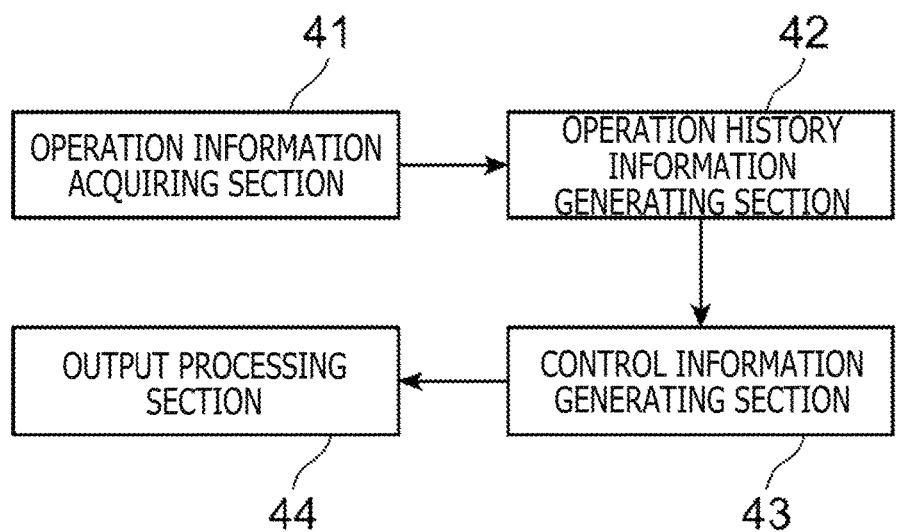
FIG. 4 is a functional block diagram illustrating an example of an information processing apparatus according to the embodiment of the present invention.

The operation device 2 further has a reaction force presenting unit 23 that presents a reaction force against the pressing action of the push button 221. As illustrated in FIG. 3, the reaction force presenting unit 23 includes an actuator 231, an arm 232 rotated by the actuator 231, and a control circuit 233 for controlling the actuator 231.

Here, the actuator 231 includes a rotating shaft, and rotates the rotating shaft in the designated direction in accordance with the instruction input from the control circuit 233. In addition, the actuator 231 detects the rotation angle of the rotating shaft and outputs the data to the control circuit 233. The arm 232 is attached to a rotating shaft of the actuator 231 and rotates around a center axis within a predetermined angle range with the rotating shaft as the center axis. In the present embodiment, the arm 232 is moved by the actuator 231 within the following range. This range is between an out-of-range position Px where the tip of the arm 232 is outside the movable range of a back surface 221B of the push button 221 (a surface which is on the housing inner side, and positioned so that the pressing direction and the normal to the surface are parallel or substantially parallel to each other (within a predetermined range of angle to the parallel) and a predetermined regulation position Py regulating the movable range of the push button 221 on the movement trajectory of the push button 221. An arbitrary point P between these points Px and Py is set as a target position and the rotation direction and rotation speed of the actuator 231 are controlled such that the tip of the arm 232 is located at the target position. In addition, in the case where the arm 232 does not move in the direction of the target position due to the operation of the user (in other words, because the user applies a force), the actuator 231 controls the rotation of the arm 232 on the basis of information regarding the resistance force (Stiffness) indicating how much amount of force (resistance force) is applied to rotate in the direction of the previously indicated target position.

According to the reaction force presenting unit 23 configured as described above, when the target position of the tip of the arm 232 is the position P that regulates the movable range of the push button 221, since the arm 232 does not come in contact with the bottom surface of the push button 221, when the push button 221 is pushed, the user can operate the push button 221 with a relatively light force (the degree of force opposing the urging force urging in the direction so as to move the outer surface 221F of the push button 221 to the position P1) until the back surface 221B reaches the position P. On the other hand, when the back surface of the push button 221 reaches the position P, the arm 232 comes into contact with the bottom surface of the push button 221, and then in order to push the push button 221 further, it becomes necessary to operate the push button 221 with a relatively strong force against the resistance force (Stiffness) of the actuator 231 that tries to move the tip of the arm 232 in the direction of the position P (maintains the tip at the position P). In this way, the reaction force presenting unit 23 presents the user with a reaction force (torque) against the force pressing the push button 221.

As described above, in the case of performing control based on the control information in which the target position is set to the position P, the magnitude of the presented resistance force is substantially "0" until the push-in position reaches the position P in relation to the push-in position of the push button 221, and if the push-in position has gone beyond the position P, a resistance force of the designated magnitude is presented.

The control circuit 233 includes a program control device such as a microcomputer, and controls the actuator 231 on the basis of control information input from the information processing apparatus 1 and the detection result of the rotation angle output from the actuator 231. Here, to be specific, the control information output by the information processing apparatus 1 includes information regarding the rotation angle of the actuator 231 corresponding to the target position of the tip of the arm 232.

When the control information is input from the information processing apparatus 1, the control circuit 233 controls the rotation direction and the rotation speed of the actuator 231 (current supplied to the actuator 231 etc.) on the basis of the information regarding the rotation angle of the actuator 231 included in the control information and the rotation angle detection result output by the actuator 231. Since this control can be performed by general feedback control, detailed description is omitted here.

Further, the control circuit 233 refers to the detection result of the rotation angle output from the actuator 231 at every predetermined timing. Then, the control circuit 233 may control the rotation direction and the rotation speed (current supplied to the actuator 231 etc.) so as to present the resistance force of the designated magnitude instead of the feedback control in the case where despite the control of the rotation direction and the rotation speed, the detection result value of the rotation angle output by the actuator 231 has not reached the angle corresponding to the target position within a predetermined time period after starting the control based on the input control information. Furthermore, while presenting the resistance force of the magnitude designated in this way, the control circuit 233 repeatedly checks whether or not an angle corresponding to the target position is included between the detection result referred to last time and the detection result referred to this time (the target position has been passed over by the control). Then, in the case where the angle corresponding to the target position is included between the detection result referred to last time and the detection result referred to this time (in the case where the target position has been passed over by the control), the control circuit 233 returns the control of the actuator 231 to feedback control.

Further, the control information output by the information processing apparatus 1 in the present embodiment may include information regarding a target position corresponding to the position of the push button 221 (detection result of the rotation angle output by the actuator 231) in another example. In this case, the control circuit 233 determines the target position with reference to the detection result of the rotation angle output from the actuator 231 and the control information. The control circuit 233 then controls the rotation direction and rotation speed of the actuator 231 (current to be supplied to the actuator 231 etc.) on the basis of the determined target position information (information regarding the rotation angle of the actuator 231) and the detection result of the rotation angle output by the actuator 231.

Furthermore, in this example, in the case where the detection result value of the rotation angle output by the actuator 231 referred to at each predetermined timing does not reach the angle corresponding to the target position within a predetermined time period from starting the control based on the input control information even though the actuator 231 is controlled, the rotation direction and the rotation speed (current supplied to the actuator 231 etc.) may be controlled so as to present a previously designated resistance force instead of the feedback control. During the control to present the resistance force designated in this manner, the control circuit 233 repeatedly checks whether or not an angle corresponding to the target position is included between the detection result referred to last time and the detection result referred to this time (the target position has been passed over by control.) Then, in the case where the angle corresponding to the target position is included between the detection result referred to last time and the detection result referred to this time (when the target position has been passed over by the control), the control circuit 233 returns the control of the actuator 231 to the feedback control.

It should be noted that the magnitude of the resistance force corresponding to the push-in can also be specified stepwise by setting the control information in which the target position is P+AP (AP is a positive or negative value) with respect to the position P of the push button 221. Therefore, the control circuit 233 may continue the feedback control even in the case where the detection result value of the rotation angle output by the actuator 231, referred to at each predetermined timing, does not reach the angle corresponding to the target position even though the control circuit 233 controls the actuator 231. In this case, when the position of the push button 221 is P, if the target position is set to be higher than P (the side on which the button is pushed in less) by AP, a resistance force greater than in the case where the target position is set to P or lower (the side on which the button is pushed in more) is presented. Further, depending on the control method, the magnitude of the resistance force can be designated stepwise further by changing the magnitude of AP. Therefore, in this example, the control circuit 233 determines the value of AP in accordance with the magnitude of the designated resistance force.

Next, an operation of the control unit 11 of the information processing apparatus 1 according to the present embodiment will be described. In an example of the present embodiment, the control unit 11 functionally includes an operation information acquiring section 41, an operation history information generating section 42, a control information generating section 43, and an output processing section 44.

Here, the operation information acquiring section 41 acquires information representing the operation content output by the operation device 2. The operation history information generating section 42 generates information representing the history of the user's operation on the basis of the information acquired by the operation information acquiring section 41 and representing the operation content output by the operation device 2. In an example of the present embodiment, the operation history information generating section 42 stores information regarding at least one of the number of past pressing actions, past maximum push-in position, and duration of the past pressing operation of the push button 221 of the operation device 2 (called a control information parameter), and generates and outputs information as information relating to the operation history.

Besides, the control unit 11 resets the stored control information parameter value at a predetermined timing. This timing may be based on the designation of the application program such as timing when the user performs an operation of grasping a virtual object to be a target for a new operation, for example.

To be specific, the operation history information generating section 42 counts the number of pressing actions of the push button 221 after a predetermined timing in the past (the number of times the button is pushed from a position below an angle corresponding to a predetermined first threshold value to a position above the angle corresponding to the first threshold value). Here, the predetermined timing in the past is determined by an application executed by the control unit 11, for example.

As an example, the control unit 11 executes a game application in which a user operates a virtual object in a virtual game space. In this example, assuming that the operation of grasping the virtual object to be a target for operation is performed by pressing the push button 221, the operation history information generating section 42 of the control unit 11 resets the count number of the pressing actions when the operation of grasping the virtual object to be a target for new operation is performed, and counts the number of pressing actions of the push button 221 after this point (number of pressing actions to an angle equal to or more than the angle corresponding to the predetermined first threshold value) to output the count value as information relating to the operation history.

Note that similarly also regarding the past maximum push-in position, the operation history information generating section 42 resets information indicating the maximum push-in position when the user performs an operation of grasping a virtual object to be a target for a new operation. Then, a maximum value of the push-in position after the reset point (in the information indicating the push-in position, it is assumed that the value increases as the push-in is advanced) is generated and output as operation history information indicating the past maximum push-in position.

In addition, the operation history information generating section 42 measures the elapsed time starting when the push-in angle has exceeded a predetermined second threshold after the push-in angle is below the second threshold last time, with respect to the duration of the past pressing operation, as the duration of the pressing operation, and outputs information regarding the measured duration as operation history information at predetermined timings (periodically, for example).

Note that the number of past pressing actions, the past maximum push-in position, or the duration of the pressing operation described above are only examples, and the operation history information generating section 42 of the present embodiment, without limiting to these, may generate information regarding the operation history of other kinds, such as information regarding the number of pressing actions from when the user starts the game.

The control information generating section 43 generates control information to be output to the operation device 2 on the basis of the information acquired by the operation information acquiring section 41 and indicating the operation content output by the operation device 2 and the information regarding the operation history generated by the operation history information generating section 42.

That is, the control information generating section 43 determines control information by using a determination criterion relating to at least one of the number of past pressing actions, past maximum push-in position, and duration of the past pressing operation, generated by the operation history information generating section 42 with respect to the push button 221 included in the operation device 2. This control information is information that indicates the magnitude of the resistance force corresponding to the push-in of the button that is presented to the user, and the magnitude of this resistance force is determined so as to be related to the push-in position of the push button 221 of the operation device 2.

As an example, the control information generating section 43 reduces the magnitude of the resistance force corresponding to the button push-in as the value indicating the number of past pressing actions increases. That is, the control information generating section 43 initially generates and outputs control information in which the target position is P and the resistance force to be presented is F. Thereafter, the control information generating section 43 sets the magnitude of the resistance force to be presented to $F-\Delta F \times (i-1)$ (here, $\Delta F$ is a value set by a prescribed method, and is a predetermined value satisfying $\Delta F > 0$, for example) when the count value of the number of pressing actions becomes i (i=integer 1, 2, . . . ) on the basis of the operation history information generated by the operation history information generating section 42. Thus, each time the count value is incremented by "1," the magnitude of the presented resistance force is caused to decrease by $\Delta F$. Incidentally, when $F-\Delta F \times (i-1)$ falls below a predetermined threshold value Fmin, the control information generating section 43 may set the magnitude of the resistance force to be presented as Fmin.

Further, in another example, the control information generating section 43 may generate control information for setting a target position at the out-of-range position Px where the tip of the arm 232 is outside the movable range of the back surface of the push button 221 when $F-\Delta F \times (i-1)$ falls below the predetermined threshold value Fmin, or when the count value i of the number of pressing actions exceeds a predetermined number N. In this case, when the pressing operation is performed more than N times, after N times, the push button 221 can be pushed without resistance force (other than the urging force to return to the original position).

Further, in one example of the present embodiment, the determination criterion used by the control information generating section 43 may be dynamically set in accordance with the application program. For example, when a game application in which a user operates a virtual object in a virtual game space is executed, a determination criterion may be different for each virtual object to be operated.

To be specific, the control unit 11 may control so as to determine the control information on the basis of a determination criterion according to the number of past pressing actions when an operation is performed on the first virtual object in the virtual space, and to determine the control information on the basis of a determination criterion according to the past maximum push-in position in the case of the operation for the second virtual object. The output processing section 44 sends the control information generated by the control information generating section 43 to the operation device 2.

[Operation]

This embodiment basically has the above configuration and operates as follows. In the following example, the case where the control unit 11 performs control of the resistance force corresponding to the push-in amount of the push button 221 in the operation device 2 when executing a game application in which the user operates a virtual object in a virtual game space will be described as an example.

The control unit 11 of the information processing apparatus 1 displays an image in the virtual game space on the display via the display control unit 13, and accepts an operation on a virtual object arranged in the virtual game space from the user. For example, as the virtual object here, the control unit 11 indicates a virtual sponge (a sponge having absorbed water) and a virtual metal ball (thin and crushable).

In this game application, it is assumed that settings have been made so that the control information for the virtual sponge is determined on the basis of a determination criterion according to the number of pressing actions in the past, and the control information for the virtual metal ball is determined on the basis of the duration of the pressing operation. Further, as initial values, it is assumed that the target position is set to Ps and the resistance force is set to Fs for the virtual sponge, and the target position is set to Pm and the resistance force is set to Fm for the metal ball.

When the user performs an operation of gripping the virtual sponge (operates the operation device 2 and presses the push button 221 while touching the virtual sponge), the control unit 11 resets information regarding the count number of pressing actions and the duration of the pressing operation as control information parameters. The control unit 11 increments the count of the number of pressing actions by "1" each time the user operates the operation device 2 and presses the push button 221 while touching the virtual sponge, and the time while the pressing action is taken is measured and accumulated as the duration of the pressing operation. The control unit 11 generates the control information to be output to the operation device 2, on the basis of information indicating the operation content output by the operation device 2 and operation history information with information regarding the count of the number of pressing actions and the duration of the pressing operation as the operation history information.

That is, the control unit 11 determines the control information on the basis of a determination criterion according to the number of the past pressing actions, with reference to the setting of the virtual object (sponge) that is the current operation target. To be specific, when the push button 221 is first pressed down, the control unit 11 outputs information regarding the target position Ps and the resistance force Fs, which are the initial values set for the virtual object (sponge) to the operation device 2 as control information.

When the push button 221 is pressed beyond the position corresponding to the target position Ps, the operation device 2 repels the pressing with the resistance force Fs. As a result, the user feels a predetermined resistance force when pushing the button beyond the target position Ps.

When the user releases the push button 221 and starts pushing again, the operation device 2 transmits the information indicating the amount of the push-in to the information processing apparatus 1. The control unit 11 of the information processing apparatus 1 increments the count of the number of pressing actions by "1" and generates control information with the resistance force F as Fs−ΔFs. Then, the control unit 11 outputs the generated control information to the operation device 2. Here, ΔFs is a value determined by a prescribed method (a predetermined value, for example).

At this stage, when the push button 221 is pushed beyond the position corresponding to the target position Ps, the operation device 2 repels the pressing with a resistance force Fs−ΔFs. As a result, the user feels a smaller resistance force than the initial resistance force when pushing the button beyond the target position Ps.

Next, each time the user releases the push button 221 and pushes the button again so that the operation device 2 transmits information indicating the amount of push-in to the information processing apparatus 1 in response to the operation, the control unit 11 of the information processing apparatus 1 increments the count of the number of pressing actions by "1." In the i-th operation, the control unit 11 generates control information with the resistance force F as Fs−ΔFs×(i−1). Then, the control unit 11 outputs the generated control information to the operation device 2.

As a result, every time the push button 221 is pressed beyond the position corresponding to the target position Ps, the resistance force felt by the user during the pressing operation is decreased in the operation device 2. This expresses a state in which the water contained in the sponge is squeezed out and the operation of squeezing becomes lighter when the sponge is repeatedly gripped.

When the user performs an operation of releasing a virtual sponge (such as releasing a finger from the push button 221 of the operation device 2), and performs an operation of grasping a virtual metal ball (presses the push button 221 while touching the virtual metal ball, by operating the operation device 2), the control unit 11 resets the information regarding the count of the number of pressing actions and the duration of the pressing operation.

In addition, the control unit 11 refers to the setting of the virtual object (metal ball) that is the current operation target, and determines the control information on the basis of the determination criterion according to the duration of the pressing operation. Then, the control unit 11 outputs information regarding the target position Pm and the resistance force Fm, which are the initial values set for the virtual object (metallic ball), to the operation device 2 as control information.

When the push button 221 is pressed beyond the position corresponding to the target position Pm, the operation device 2 repels the pressing with the resistance force Fm. As a result, the user feels a predetermined resistance force when pressing the button beyond the target position Pm.

Thereafter, when the user keeps depression of the push button 221 of the operation device 2, the operation device 2 transmits information regarding the push-in amount in the pressed state to the information processing apparatus 1. The control unit 11 determines that the push button 221 of the operation device 2 is maintained in a pressed state on the basis of the information, and measures the duration thereof.

The control unit 11 repeatedly determines at predetermined timings (for example, once every 1/30 seconds) whether or not the measured duration exceeds a predetermined threshold value (for example, three seconds). The control unit 11 does not newly output control information while determining that the measured duration does not exceed the predetermined threshold. For this reason, if the user does not perform an operation of gripping a virtual target (a metal ball) with duration exceeding the threshold value, a state in which a predetermined resistance force is felt is presented to the user when the button is pressed beyond the target position Pm.

On the other hand, when determining that the measured duration has exceeded the predetermined threshold value, the control unit 11 sets the target position to the out-of-range position Px where the tip of the arm 232 of the operation device 2 is outside the movable range of the back surface of the push button 221. This gives the user a feeling as if the push button 221 does not resist the pressing.

At this time, the control unit 11 may generate an image as if the metal ball has burst, and output the image via the display control unit 13 in addition. While holding the metal ball, the user is presented with a feeling as if it were broken.

[Example of Using a Vibration Device Together]

The operation device 2 may include a vibration device 24 controlled by the control unit 222, inside the housing (illustrated using a broken line in FIG. 2). Here, as the vibration device 24, a widely known device such as a voice coil motor (VCM) or a vibrator can be adopted.

In this example, the control unit 11 of the information processing apparatus 1 output control information to present a resistance force on the push button 221 to the operation device 2 together with information regarding the intensity of the vibration, a vibration waveform and the like when causing the vibration device 24 to vibrate. The control unit 11 may control to determine whether or not vibration instruction is output or what kind of vibration instruction is output, on the basis of a criterion including at least one of the number of past pressing actions, past maximum push-in position, and duration of the pressing operation of the push button 221 of the operation device 2, also with regard to this vibration instruction.

In the case where information such as the vibration intensity and the vibration waveform of the vibration device 24 is included in the control information received from the information processing apparatus 1, the operation device 2 controls the vibration device 24 to vibrate the operation device 2 on the basis of the information.

[Examples of Various Control Information]

Further, in the above description, though an example of control information regarding examples of a sponge and a metal ball as virtual objects has been described, the present embodiment is not limited to this. That is, the initial setting of each virtual object and the method of determining the control information can be illustrated by examples as follows, including the examples of the sponge and the like described above.

[Sponge]

Initial value: the target position Ps and the initial resistance force Fs.

Method for determining control information: the resistance force is set as $F=Fs-\Delta Fs\times(i-1)$ using a positive value $\Delta Fs$ determined by a prescribed method, on the basis of the number i of pressing actions. However, when $Fs-\Delta Fs\times(i-1)<Fmin$ is satisfied, $F=Fmin$ is set. Thus, a situation is produced in which the resistance force decreases each time the sponge is squeezed up to the predetermined number of times.

Further, when determining the magnitude of the resistance force, the control unit 11 may determine the magnitude on the basis of information Pc regarding the push-in position of the push button 221 at this time, received from the operation device 2 at the time of the determination.

In this case, the control unit 11 determines a function F (Pc) representing the resistance force corresponding to the push-in position using the predetermined positive value $\Delta Fs$, for example, on the basis of the number i of the pressing actions as follows:

$$F(Pc)=fs\times(Pc-Ps)-\Delta Fs\times(i-1)\times(Pc-Ps)$$

Here, it is sufficient to set as $fs=Fs/Ps$.

Figure 5:
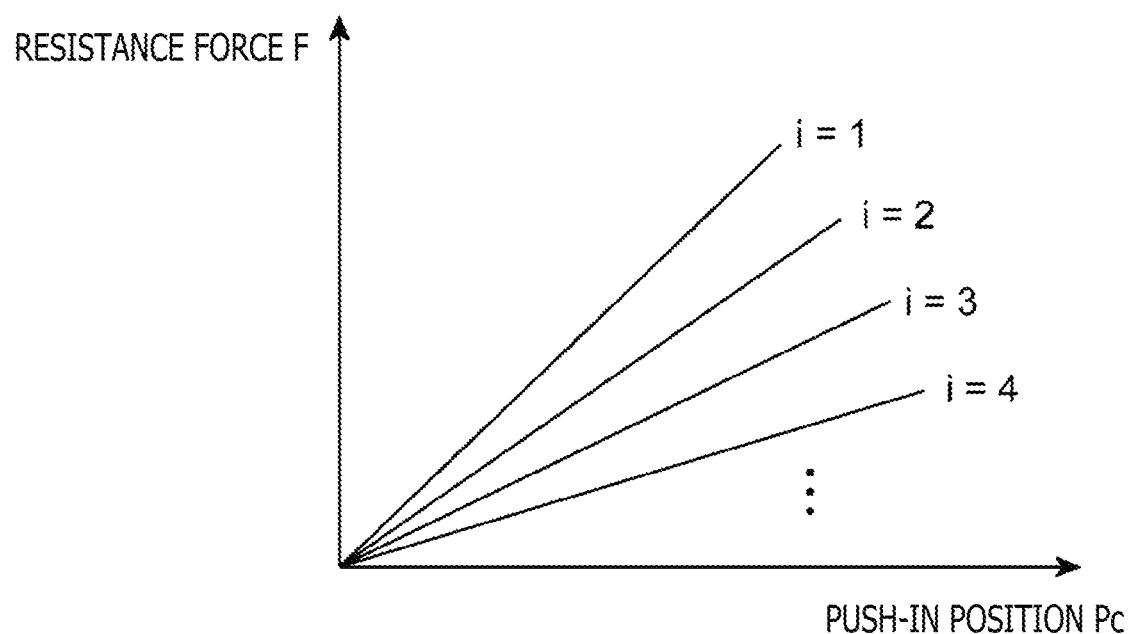
FIG. 5 is an explanatory diagram illustrating an example of control information by the information processing apparatus according to the embodiment of the present invention.

In this example, the resistance force in proportion to the push-in amount is presented to the user, but the resistance force at that time becomes smaller overall as the number i of pressing actions increases (FIG. 5).

[Metal Objects]

Initial value: the target position Pm and the initial resistance force Fm. Note that a hard feeling is given to the user by setting the resistance force Fm relatively large.

Method for determining control information: the initial value setting information is maintained while the duration t is smaller than the predetermined threshold T, on the basis of the duration t of the pressing operation. When $t>T$ becomes satisfied, the target position is set to the out-of-range position Px where the tip of the arm 232 of the operation device 2 is out of the movable range of the back surface of the push button 221. As a result, a performance is produced as if the object had been broken when the gripping continues until the time set by the threshold value has passed.

Note that the control unit 11 may further include control information for causing the vibration device 24 to vibrate when the duration t of the pressing operation is larger than another threshold value T2 that is less than the threshold value T. A feeling of breaking shortly can be given to the user.

[In the Case of Objects that Gradually Collapse, Such as Cans]

Initial value: the target position Pm and the initial resistance force Fm.

Method for determining control information: on the basis of the duration t of the pressing operation, as long as the duration t is smaller than the predetermined threshold T, the target position Pm is set to $Pm-\Delta Pm\times t$ (where $\Delta Pm$ is a positive value determined by a prescribed method, and a predetermined positive value, for example) and the resistance force F keeps on being Fm that is in the initial value setting information. When $t>T$ becomes satisfied, the target position is set to the out-of-range position Px where the tip of the arm 232 of the operation device 2 is out of the movable range of the back surface of the push button 221.

As a result, until the time set by the threshold value elapses, the position where the resistance force is presented becomes a position where the button is pushed in more when the user continues the gripping (the feeling of gradually crushing is presented), and the performance is produced as if the object had been completely crushed when the user continues the gripping. Control information for vibrating the vibration device 24 at the timing when the target position is made different from that in the control information output last time may be further included. In this way, the vibration is presented at the timing of the collapse, and the feeling that the object such as a can is crushed can be presented more strongly.

[Inflator (Inflator Connected to Balloons Etc.)]

Initial values: a target position Pb and an initial resistance force Fb.

Method for determining control information: by using a positive value $\Delta Fb$ determined by a prescribed method (a predetermined value, for example) on the basis of the number i of pressing actions, the resistance force is set as $F=Fb+\Delta Fb\times(i-1)$. However, when $Fb+\Delta Fb\times(i-1)>Fmax$ becomes satisfied, the target position is set to the out-of-range position Px where the tip of the arm 232 of the operation device 2 is outside the movable range of the back surface of the push button 221. By doing this, the performance is produced in which the resistance is increased (making the button heavy) each time an operation of putting air into the balloon (pressing operation) is performed and the balloon bursts and loses resistance force when the limit is exceeded.

[Living Organisms Such as Birds]

Initial value: a target position Pv and an initial resistance force Fv.

Method for determining control information: when the push-in position has a smaller value than a predetermined threshold value Pth (Pth means a position where the button is pushed in further from Pv) and a larger value than the initial target position Pv, control information for causing the vibration device 24 to vibrate is included. When the push-in position has a larger value than the predetermined threshold value Pth (Pth means a position where the button is pushed in further from Pv), the control information relating to the vibration of the vibration device 24 is not output. This gives a feeling of handling a living organism such as a bird, which becomes wild when held lightly and becomes quiet when held strongly.

[Glass]

Initial values: a target position Pg and an initial resistance force Fg. Note that the resistance force Fg is set relatively small.

Method for determining control information: when the push-in position has a larger value than a predetermined threshold value Pgth (Pgth means a position where the button is pushed in further from Pg), control information relating to the vibration of the vibration device 24 is output, and the target position is set to the out-of-range position Px where the tip of the arm 232 of the operation device 2 is outside the movable range of the back surface of the push button 221. By setting the difference between Pg and Pgth to be relatively small, the user is given a feeling of glass breaking immediately.

[Stone]

Initial value: a target position Pe and an initial resistance force Fe.

Method for determining control information: when the push-in position has a larger value than a predetermined threshold value Peth (Peth means a position where the button is pushed in further from Pe), control information related to the vibration of the vibration device 24 is output, and the target position is set to Pe+ΔPe, and the threshold is set to Peth+ΔPe. Here, ΔPe is a positive value determined by a prescribed method (determined in advance, for example.

Further, when the calculation result value of the target position exceeds a threshold value Peth2 which is separately determined (the position becomes where the button is pushed in from Peth2), the target position is set to the out-of-range position Px where the tip of the arm 232 of the operation device 2 is outside the movable range of the back surface of the push button 221. This gives the user the feeling of a stone being progressively destroyed and becoming smaller.

[Fish]

Initial value: a target position Pf and an initial resistance force Ff.

Method for determining control information: when the push-in position has a larger value than a predetermined threshold value Pfth (Pfth means a position where the button is pushed in further from Pf), control information relating to the vibration of the vibration device 24 is output. The vibration here has a random waveform. This gives the user a feeling of a fish bouncing around at the time of being held.

[Control Based on Past Maximum Push-in Position]

The control unit 11 may further use a past maximum push-in position as a control information parameter used when determining control information. In this example, the operation history information generating section 42 resets the past maximum push-in position, which is a control information parameter, at the time when the user performs an operation of grasping a virtual object to be a target for a new operation (for example, a value that represents the position where the button is not pushed in).

Then, the operation history information generating section 42 compares information Pcurrent regarding a push-in position output from the operation device 2 with stored information Pmemory regarding a maximum push-in position, and when the push-in position Pcurrent indicated by the push-in position information output by the operation device 2 represents a position where the button is pushed in more than the stored information Pmemory regarding the maximum push-in position (when Pcurrent>Pmemory), the stored information regarding the maximum push-in position is replaced with the information regarding push-in position output by the operation device (set as Pmemory=Pcurrent).

While performing control to reduce the magnitude of the resistance force corresponding to the button push-in as the value indicating the number of past pressing actions increases, for example, the control information generating section 43 of the control unit 11 refers to the information regarding the past maximum push-in position, and controls the amount of reduction.

That is, in one example of the present embodiment, the control information generating section 43 initially generates and outputs control information in which the target position is P and the resistance force to be presented is F. Thereafter, the control information generating section 43 reduces the resistance force by a reduction amount ΔF (Pmemory) corresponding to the information Pmemory regarding the past maximum push-in position from the magnitude F of the currently presented resistance force every time the count value of the number of pressing actions is incremented by "1" on the basis of the information regarding the operation history generated by the operation history information generating section 42.

To be specific, the reduction amount ΔF (Pmemory) may have a proportional relationship of ΔF=α·Pmemory+ΔFdefault. Here, α and ΔFdefault are values that are appropriately determined (for example, specified by an application), and are positive real numbers, for example.

Thus, each time the count value is incremented by "1," the magnitude of the presented resistance force is caused to decrease by ΔF (Pmemory) proportional to the past maximum push-in amount. Therefore, when the user has pressed the button sufficiently in the past, the resistance force is reduced accordingly, and for example, a feeling or the like that is felt when the wet sponge is squeezed strongly can be presented to the user.

[Example of Controlling a Plurality of Operation Devices]

In the description so far, the case where the number of the operation devices 2 is one has been described as an example, but the number of the operation devices 2 may be two or more. In addition, in this case, each operation device 2 does not necessarily have to be operated by one user.

In this example, the control unit 11 stores the number of pressing actions, past maximum push-in position, and duration of the pressing operation of the push button 221 for each operation device 2 as control information parameters, and resets the parameters at a predetermined timing. Further, the control information to be output to each operation device 2 is determined on the basis of at least one of information regarding the current (at the time of input) push-in amount of the push button 221 input from each operation device 2 and the control information parameter regarding each operation device 2.

For example, with regard to the pair of operation devices 2a and 2b, the control unit 11 sets target position information Pb in the control information to be output to the operation device 2b as Pb=Pmax−Pa, on the basis of the information Pa regarding the push-in amount of the push button 221 input from one operation device 2a. Here, Pmax is a maximum value that Pa can be. According to this example, as the push-button of the operation device 2a is pushed in more, the pushing position where the resistance force is felt on the push button 2b of the operation device 2b becomes shallower (a position where the button is less pushed in), and a performance can be presented so that if one end is squeezed strongly while a long balloon is held at the both ends, the other end swells and gives a feeling of resistance force.

[Control Based on Device Attitude Information]

Further, the control unit 11 may adjust the control information for the operation device 2 by receiving a detection result of an attitude detection device (for example, an acceleration sensor for detecting a direction of gravity or the like) (not illustrated) provided in the operation device 2. For example, when the push button 221 is facing downward in the direction of gravity, the target position P of the push-in amount may be corrected by multiplying the amount by a predetermined value γ smaller than 1.

[Polling Timing]

Further, in the present embodiment, the control unit 11 may set control so that the number of times of receiving the information representing the operation content (including information regarding the amount of push-in) from the operation device 2 and transmitting the control information is larger (300 times per second, for example) than the number of times of control of image information corresponding to the virtual target (60 times per second, for example).

In this way, in the case where the information regarding the target position and the resistance force related to the control of the actuator 231 and the information regarding the vibration waveform related to the control of the vibration device 24 cannot be transmitted at the same time, with regard to the control information for the operation device 2, for example (the information cannot be transmitted as one piece of control information because of a different protocol for communication etc.), the control information can be generated and transmitted with a sufficient margin before the image changes for the virtual object.

REFERENCE SIGNS LIST

1 Information processing apparatus, 2 Operation device, 11 Control unit, 12 Storage unit, 13 Display control unit, 14 Communication unit, 15 Interface unit, 21 Grip portion, 22 Operational portion, 23 Reaction force presenting unit, 24 Vibration device, 41 Operation information acquiring section, 42 Operation history information generating section, 43 Control information generating section, 44 Output processing section, 221 Push button, 222 Control unit, 231 Actuator, 232 Arm, 233 Control circuit.

The invention claimed is:

1. An information processing apparatus connected to a device which has a button that is able to be pressed in a predetermined movable range, the device detecting a push-in position of the button when the button is pressed, and the device being able to present a resistance force that repels a pressing force of the button, the information processing apparatus comprising:
operation history information generating means for generating operation history including a number of past button presses, a past maximum push-in position, and a duration of past button presses;
determination means that determines control information indicating a magnitude of the resistance force to be presented according to the operation history, the magnitude being related to the push-in position of the button, based on a duration of a pressing operation of the button of the device; and
means that outputs the determined control information to the device.

2. The information processing apparatus according to claim 1, further comprising:
means that accepts an operation on a virtual object arranged in a virtual space from a user, wherein
the determination criterion and a control information candidate determined by the determination criterion are set for each of the virtual objects, and
the determination means determines control information to be output to the device, based on the determination criterion and the control information candidate set for the virtual object to be operated.

3. The information processing apparatus according to claim 1, wherein
the device has a vibrator that vibrates the device and causes the vibrator to vibrate in accordance with an instruction, and
the information processing apparatus further includes means instructing the vibrator to vibrate,
wherein vibration of the vibrator is increased as the push in position of the button is increased.

4. The information processing apparatus according to claim 1, wherein if the duration of the pressing operation stored in the operation history exceeds a predetermined threshold value, the magnitude of the resistance force decreases over time.

5. The information processing apparatus according to claim 1, wherein if the duration of the pressing operation exceeds a predetermined threshold, the resistance force is stopped.

6. A method for processing information using an information processing apparatus connected to a device which includes a button that is able to be pressed in a predetermined movable range, the device detecting a push-in position of the button when the button is pressed, and the device being able to present a resistance force repelling a pressing force of the button, the method comprising:
generating operation history including a number of past button presses, a past maximum push-in position, and a duration of past button presses;
determining by determination means, control information representing a magnitude of the resistance force to be presented according to the operation history, the magnitude being related to the push-in position of the button, based on a number of pressing actions; and
outputting by output means, determined control information to the device.

7. The method according to claim 4, wherein the magnitude of the resistance force is decreased as the number of button presses stored in the operation history increases.

8. The method according to claim 7, wherein the magnitude of the resistance force is decreased until reaching a minimum force threshold.

9. A non-transitory computer readable medium having stored thereon a program for an information processing apparatus connected to a device which includes a button that is able to be pressed in a predetermined movable range, the device detecting a push-in position of the button when the button is pressed, and the device being able to present a resistance force repelling a pressing force of the button, the program comprising:
by operation history information generating means, generating operation history including a number of past button presses, a past maximum push-in position, and a duration of past button presses;
by determination means, determining control information representing a magnitude of the resistance force to be presented according to the operation history, the magnitude being related to the push-in position of the button, based on a duration of a pressing operation of the button of the device; and
by means, outputting the determined control information to the device.

* * * * *